United States Patent
Aharoni et al.

(10) Patent No.: US 12,093,538 B2
(45) Date of Patent: Sep. 17, 2024

(54) SELECTIVE POWERING OF STORAGE DRIVE COMPONENTS IN A STORAGE NODE BASED ON SYSTEM PERFORMANCE LIMITS

(71) Applicant: Dell Products L.P., Round Rock, TX (US)

(72) Inventors: Dan Aharoni, Brookline, MA (US); Christopher Trudel, Florence, TX (US); Pablo Srabstein, Yokneam Ha Moshava (IL)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 17/718,719

(22) Filed: Apr. 12, 2022

(65) Prior Publication Data
US 2023/0325097 A1 Oct. 12, 2023

(51) Int. Cl.
*G06F 3/06* (2006.01)
*G06F 1/3203* (2019.01)
*G06F 1/3287* (2019.01)

(52) U.S. Cl.
CPC .......... *G06F 3/0625* (2013.01); *G06F 1/3203* (2013.01); *G06F 1/3287* (2013.01);
(Continued)

(58) Field of Classification Search
CPC .... G06F 1/3221; G06F 1/3225; G06F 1/3268; G06F 1/3203; G06F 1/3275;
(Continued)

(56) References Cited

U.S. PATENT DOCUMENTS

| 8,751,836 B1 * | 6/2014 | Piszczek | G06F 1/3268 |
| | | | 713/320 |
| 9,740,267 B1 * | 8/2017 | Cordero | G06F 1/3296 |

(Continued)

OTHER PUBLICATIONS

Beal, Vangie; "MAID Massive Array of Idle Disks", https://www.webopedia.com/definitions/massive-array-of-idle-disks/#:~: text=MAID%20%E2%80%93%20massive%20array%20of%20idle%20disks&text=In%20storage%20terminology%20a%20massive,spinning%20at%20any%20given%20time; Updated May 24, 2021; downloaded on Apr. 4, 2022.

(Continued)

*Primary Examiner* — Thomas J. Cleary
(74) *Attorney, Agent, or Firm* — Ryan, Mason & Lewis, LLP

(57) ABSTRACT

Techniques are provided for selective powering of storage drive components in a storage node based on system performance limits. One method comprises determining a number of storage drive components, of multiple storage drive components in a storage node, needed to support at least one workload of the storage node, wherein the determining is based at least in part on a number of storage drive components needed to support a system performance limit determined using a component performance limit of at least one other component of the storage node, wherein the component performance limit is based at least in part on one or more of an expected number of input/output operations of the storage node and an expected bandwidth of the storage node; and initiating an application of power to the determined number of storage drive components of the storage node.

20 Claims, 5 Drawing Sheets

(52) U.S. Cl.
CPC .......... *G06F 3/0629* (2013.01); *G06F 3/0679* (2013.01); *G06F 3/0685* (2013.01)

(58) Field of Classification Search
CPC .... G06F 1/3287; G06F 3/0625; G06F 3/0629; G06F 3/0679; G06F 3/0685; G06F 3/0688; G06F 3/0689; G06F 3/0683; G06F 3/0634; H04L 47/83; H04L 67/1008

See application file for complete search history.

(56) References Cited

U.S. PATENT DOCUMENTS

| | | | | |
|---|---|---|---|---|
| 10,521,124 | B1* | 12/2019 | Aharoni | G06F 3/0631 |
| 2010/0019576 | A1* | 1/2010 | Buterbaugh | H02J 1/001 |
| | | | | 307/53 |
| 2011/0047316 | A1* | 2/2011 | Farhan | G06F 1/3275 |
| | | | | 713/320 |
| 2014/0003180 | A1* | 1/2014 | Matsuda | G01R 21/00 |
| | | | | 324/113 |
| 2015/0121113 | A1* | 4/2015 | Ramamurthy | H02J 9/062 |
| | | | | 713/340 |
| 2015/0177814 | A1* | 6/2015 | Bailey | G06F 1/3296 |
| | | | | 713/320 |
| 2015/0331473 | A1* | 11/2015 | Jreji | G06F 1/3268 |
| | | | | 713/320 |
| 2016/0027145 | A1* | 1/2016 | Taylor | G09G 5/393 |
| | | | | 345/555 |
| 2016/0139639 | A1* | 5/2016 | Dash | G06F 1/3221 |
| | | | | 713/320 |
| 2016/0282892 | A1* | 9/2016 | Saavedra | G06F 1/263 |
| 2019/0272012 | A1* | 9/2019 | Kachare | G06F 1/3268 |
| 2019/0272021 | A1* | 9/2019 | Olarig | G06F 3/0688 |

OTHER PUBLICATIONS

Porter, Evan; "Should You Shut Down, Sleep, or Hibernate your Laptop?", https://www.safetydetectives.com/blog/shut-down-vs-sleep-vs-hibernate/#:~: text=Sleep%20is%20a%20power%2Dsaving,attached%20drives%2C%20etc.); downloaded on Apr. 4, 2022.

* cited by examiner

SELECTIVE POWERING OF STORAGE DRIVE COMPONENTS IN A STORAGE NODE BASED ON SYSTEM PERFORMANCE LIMITS

FIELD

The field relates generally to information processing systems, and more particularly to storage in such information processing systems.

BACKGROUND

Information processing systems often include storage systems comprising multiple storage nodes. Such storage systems are often dynamically reconfigurable under software control in order to adapt the number and type of storage nodes and the corresponding system storage capacity as needed, in an arrangement commonly referred to as a software-defined storage system. When a new storage node is deployed in the storage system, the initial capacity requirement is usually low. Over time, additional capacity of the storage node is utilized, but it can often take a significant amount time before all of the available capacity of the storage node is consumed.

In such arrangements, the power consumption of each storage node is often an important consideration to reduce the costs and/or environmental impact associated with each storage node.

SUMMARY

Illustrative embodiments provide techniques for selective powering of storage drive components in a storage node based on system performance limits. One method comprises determining a number of storage drive components, of a plurality of storage drive components in at least one storage node of a storage system, needed to support at least one workload of the at least one storage node, wherein the determining is based at least in part on a number of storage drive components needed to support a system performance limit determined using a component performance limit of at least one other component of the at least one storage node, wherein the component performance limit is based at least in part on one or more of an expected number of input/output operations of the at least one storage node and an expected bandwidth of the at least one storage node; and initiating an application of power to the determined number of storage drive components of the at least one storage node.

In one or more embodiments, the determined number of storage drive components that have an application of power may be updated in response to a change in at least one of: (i) an expected capacity demand of the at least one workload, and (ii) the system performance limit based on the one or more of the expected number of input/output operations of the at least one storage node and the expected bandwidth of the at least one storage node.

In some embodiments, a wear level of at least some of the plurality of storage drive components is monitored and (i) the determined number of storage drive components of the at least one storage node that have an application of power, and/or (ii) a membership of the storage drive components of the at least one storage node that have an application of power is dynamically adjusted, based at least in part on the monitored wear level.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

One or more aspects of the disclosure recognize that using only those storage drives in a storage node that are needed to support the current demands of the storage node, and maintaining the additional storage nodes that are not needed in a powered off state, can significantly reduce the power consumption of the storage node. As the storage capacity needs of the storage node change over time, additional storage drives can be dynamically added or removed to satisfy the current needed storage capacity.

One or more additional aspects of the disclosure recognize that the storage drives are typically not a performance bottleneck in a storage system, especially when the storage drives are implemented as solid-state drives. Thus, in at least some embodiments, a system performance limit is determined by evaluating a component performance limit of at least one other component of a storage node, such as network card components, processing unit components and input-output card components of the storage node. For example, the system performance limit may be determined by determining a minimum component performance limit of at least one other component of a storage node, and then the number of storage drives needed to support at least one workload of the at least one storage node can be based on the number of storage drives needed to support the system performance limit. The component performance limit of each of the additional components of the storage node can be based on an expected number of input-output operations of the at least one storage node and/or an expected bandwidth of the at least one storage node.

Figure 1:
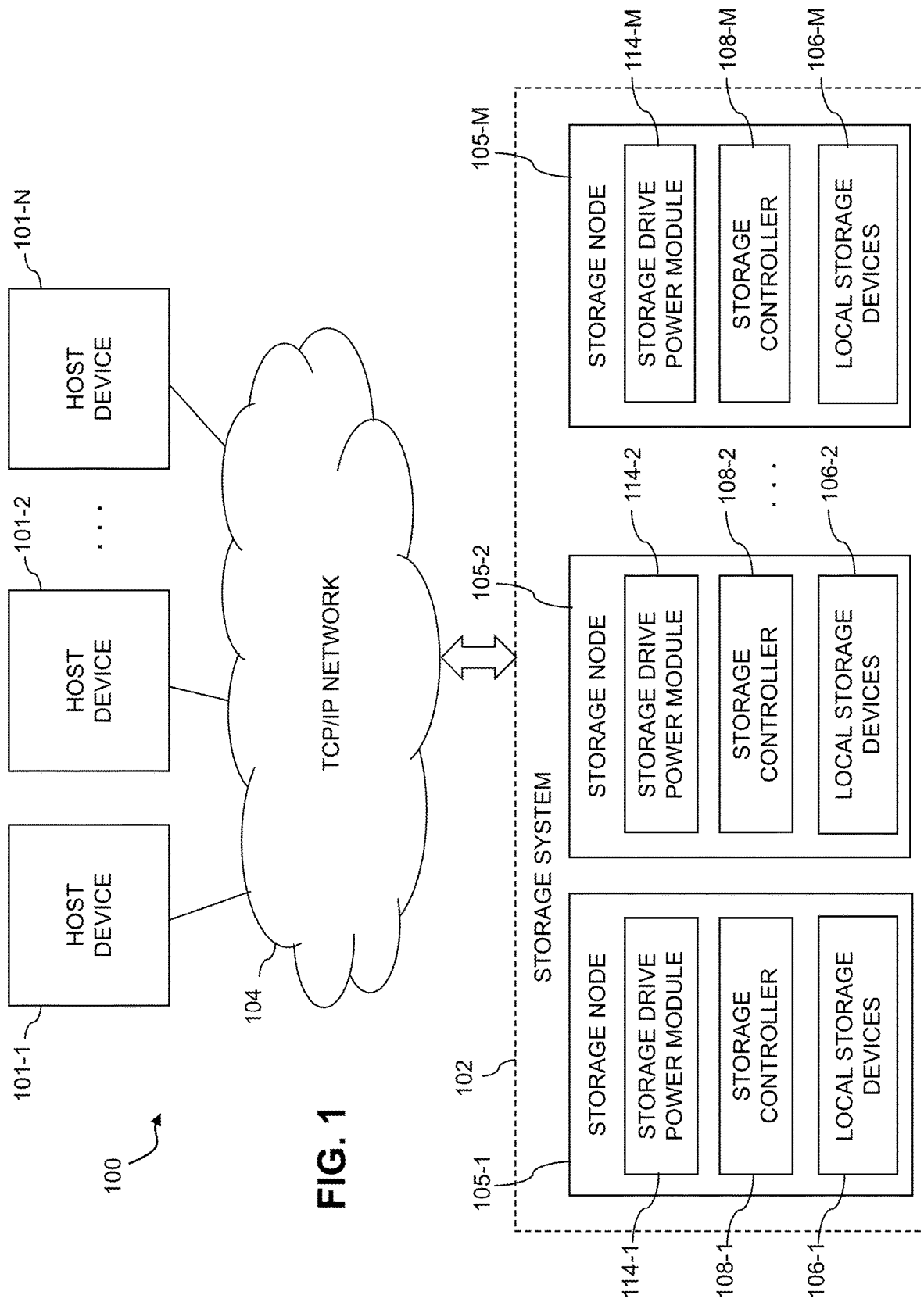
FIG. 1 is a block diagram of an information processing system incorporating functionality for selective powering of storage drive components in a storage node of a storage system in an illustrative embodiment.

FIG. 1 shows an information processing system 100 configured in accordance with an illustrative embodiment. The information processing system 100 comprises a plurality of host devices 101-1, 101-2, ... 101-N, collectively referred to herein as host devices 101, and a storage system 102 shared by the host devices 101. The host devices 101 and storage system 102 in this embodiment are configured to communicate with one another via a network 104 that illustratively utilizes protocols such as Transmission Control Protocol (TCP) and/or Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

The storage system 102 more particularly comprises a plurality of storage nodes 105-1, 105-2, ... 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the storage system 102, which is one sometimes referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space.

Other types of distributed storage systems can be used in other embodiments. For example, storage system 102 can comprise multiple distinct storage arrays, such as a production storage array and a backup storage array, possibly deployed at different locations. Accordingly, in some embodiments, one or more of the storage nodes 105 may each be viewed as a separate storage array with its own logical address space. Alternatively, the storage nodes 105 can be viewed as collectively comprising one or more storage arrays. The term "storage node" as used herein is therefore intended to be broadly construed.

In some embodiments, the storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments.

Each of the storage nodes 105 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the storage system 102 in some embodiments are referred to herein as "in-flight" IOs that have been admitted by the storage nodes 105 to further processing within the system 100. The storage nodes 105 are illustratively configured to queue IO operations arriving from one or more of the host devices 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms.

The host devices 101 are illustratively configured to write data to and read data from the storage system 102 comprising storage nodes 105 in accordance with applications executing on those host devices 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, a STaaS model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand or Gigabit Ethernet, in addition to or in place of FC. Numerous alternative networking arrangements are possible in a given embodiment, as will be appreciated by those skilled in the art. Other examples include RDMA over Converged Ethernet (ROCE) or InfiniBand over Ethernet (IBoE).

The first storage node 105-1 comprises a plurality of storage devices 106-1, an associated storage controller 108-1 and an associated storage drive power module 114-1. The storage devices 106-1 store metadata pages and user data pages associated with one or more storage volumes of the storage system 102. The storage volumes illustratively comprise respective logical units (LUNs) or other types of logical storage volumes. The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2, an associated storage controller 108-2 and an associated storage drive power module 114-2, and storage node 105-M comprises a plurality of storage devices 106-M, an associated storage controller 108-M and an associated storage drive power module 114-M.

In at least some embodiments, the storage drive power module 114 on each respective storage node 105 is configured to implement the selective storage drive powering functionality disclosed herein for the storage drive components within the respective local storage devices 106 of the respective storage node 105, as discussed further below in conjunction with FIGS. 2 and 3.

The storage devices 106-2 through 106-M store metadata pages and user data pages associated with one or more storage volumes of the storage system 102, such as the above-noted LUNs. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 105 via remote interfaces. For example, it is assumed in some embodiments disclosed herein that each of the storage devices 106 on a given one of the storage nodes 105 can be accessed by the given storage node via its local interface, or by any of the other storage nodes via a remote direct memory access (RDMA) interface. A given storage application executing on the storage nodes 105 illustratively requires that all of the storage nodes 105 be able to access all of the storage devices 106. Such access to local persistent storage of each node from the other storage nodes can be performed, for example, using the RDMA interfaces with the other storage nodes, although numerous other arrangements are possible.

The storage controllers 108 of the storage nodes 105 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid-state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 105 of the distributed storage system of FIG. 1.

In some embodiments, the storage nodes 105 of the distributed storage system collectively provide a scale-out storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 105 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 105 illustratively comprise SCSI or iSCSI commands, other embodiments can implement IO operations utilizing command features and functionality associated with NVM Express (NVMe), as described in the NVMe Specification, Revision 2.0a, July 2021, which is incorporated by reference herein. Other examples of NVMe storage access protocols that may be utilized in illustrative embodiments disclosed herein include NVMe over Fabrics, also referred to herein as NVMeF, and NVMe over TCP, also referred to herein as NVMe/TCP.

Some embodiments disclosed herein are configured to utilize one or more RAID arrangements to store data across the storage devices 106 in each of one or more of the storage nodes 105 of the storage system 102.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage controllers 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes an array of n different "disks" denoted 1 through n, each a different physical storage device of the storage devices 106. Multiple such physical storage devices are typically utilized to store data of a given LUN or other logical storage volume in the distributed storage system. For example, data pages or other data blocks of a given LUN or other logical storage volume can be "striped" along with its corresponding parity information across multiple ones of the disks in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the disks to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are connected to each other in a full mesh network, and are collectively managed by a system manager. A given set of local persistent storage devices 106 on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The given host device above is an example of what is more generally referred to herein as "at least one processing device" that includes a processor coupled to a memory.

In some embodiments, the initiator of the given host device and the targets of the respective storage nodes 105 are configured to support a designated standard storage access protocol, such as an NVMe access protocol or a SCSI access protocol. As more particularly examples in the NVMe context, the designated storage access protocol may comprise an NVMeF or NVMe/TCP access protocol, although a wide variety of additional or alternative storage access protocols can be used in other embodiments.

An initiator of the given host device may be implemented at least in part within a smart network interface card (SmartNIC) of the host device utilizing a data processing unit (DPU) of the SmartNIC. Numerous other implementation arrangements involving other types of processing devices can be used.

The host devices 101 can comprise additional or alternative components. For example, in some embodiments the host devices 101 further comprise respective sets of IO queues and respective multi-path input-output (MPIO) drivers. The MPIO drivers collectively comprise a multi-path layer of the host devices 101. Path selection functionality for delivery of IO operations from the host devices 101 to the storage system 102 is provided in the multi-path layer by respective instances of path selection logic implemented within the MPIO drivers.

In some embodiments, the host devices 101 comprise respective local caches, implemented using respective memories of those host devices. A given such local cache can be implemented using one or more cache cards. A wide variety of different caching techniques can be used in other embodiments, as will be appreciated by those skilled in the art. Other examples of memories of the respective host devices 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers are illustratively configured to deliver IO operations selected from their respective sets of IO queues to the storage system 102 via selected ones of multiple paths over the network 104. The sources of the IO operations stored in the sets of IO queues illustratively include respective processes of one or more applications executing on the host devices 101. For example, IO operations can be generated by each of multiple processes of a database application running on one or more of the host devices 101. Such processes issue IO operations for delivery to the storage system 102 over the network 104. Other types of sources of IO operations may be present in a given implementation of system 100.

A given IO operation is therefore illustratively generated by a process of an application running on a given one of the host devices 101, and is queued in one of the IO queues of the given host device with other operations generated by other processes of that application, and possibly other processes of other applications.

The paths from the given host device to the storage system 102 illustratively comprise paths associated with respective initiator-target pairs, with each initiator comprising a host bus adaptor (HBA) or other initiating entity of the given host device and each target comprising a port or other targeted entity corresponding to one or more of the storage devices 106 of the storage system 102. As noted above, the storage devices 106 illustratively comprise LUNs or other types of logical storage devices.

In some embodiments, the paths are associated with respective communication links between the given host device and the storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver of the given host device in delivering IO operations from the IO queues of that host device to the storage system 102 over particular paths via the network 104. Each such IO operation is assumed to comprise one or more commands for instructing the storage system 102 to perform particular types of storage-related functions such as reading data from or writing data to particular logical volumes of the storage system 102. Such commands are assumed to have various payload sizes associated therewith, and the payload associated with a given command is referred to herein as its "command payload."

A command directed by the given host device to the storage system 102 is considered an "outstanding" command until such time as its execution is completed in the viewpoint of the given host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

As indicated previously, the storage nodes 105 of the storage system 102 process IO operations from one or more host devices 101 and in processing those IO operations run various storage application processes that generally involve interaction of that storage node with one or more other ones of the storage nodes.

In the FIG. 1 embodiment, the storage system 102 comprises storage drive power modules 114, storage controllers 108 and corresponding sets of storage devices 106, and may include additional or alternative components, such as sets of local caches.

The storage controllers 108 illustratively control the processing of IO operations received in the storage system 102 from the host devices 101. For example, the storage controllers 108 illustratively manage the processing of read and write commands directed by the MPIO drivers of the host devices 101 to particular ones of the storage devices 106. The storage controllers 108 can be implemented as respective storage processors, directors or other storage system components configured to control storage system operations relating to processing of IO operations. In some embodiments, each of the storage controllers 108 has a different one of the above-noted local caches associated therewith, although numerous alternative arrangements are possible.

An additional example of an illustrative process for implementing at least some of the above-described selective storage drive powering functionality by the storage drive power module 114 will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

As another example, the storage nodes 105 in some embodiments are part of a distributed content addressable storage system in which logical addresses of data pages are mapped to physical addresses of the data pages in the storage devices 106 using respective hash digests, hash handles or other content-based signatures that are generated from those data pages using a secure hashing algorithm. A wide variety of other types of distributed storage systems can be used in other embodiments.

Also, the term "storage volume" as used herein is intended to be broadly construed, and should not be viewed as being limited to any particular format or configuration.

In some embodiments, the storage nodes 105 are implemented using processing modules that are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in the full mesh network, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RDMA. For example, respective sets of IP links used in data transfer and corresponding messaging could be associated with respective different ones of the routing modules.

The particular features described above in conjunction with FIG. 1 should not be construed as limiting in any way, and a wide variety of other system arrangements utilizing selective powering of storage drives of storage nodes of a distributed storage system are possible.

The storage nodes 105 of the example storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated host devices 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the host devices 101 and the storage nodes 105 to reside in different data centers. Numerous other distributed implementations of the storage nodes 105 and their respective associated sets of host devices 101 are possible.

Additional examples of processing platforms utilized to implement storage systems and possibly their associated host devices in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as host devices 101, storage system 102, storage nodes 105, storage devices 106 and storage controllers 108 can be used in other embodiments.

It should be understood that the particular sets of modules and other components implemented in a system as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, which illustrates a process 200 for selective powering of storage drive components in a storage node based on system performance limits. This process may be viewed as an example algorithm implemented at least in part by a given one of the storage nodes 105 utilizing its corresponding instance of storage drive power module 114. These and other algorithms for selective storage drive powering as disclosed herein can be implemented using other types and arrangements of system components in other embodiments.

Figure 2:
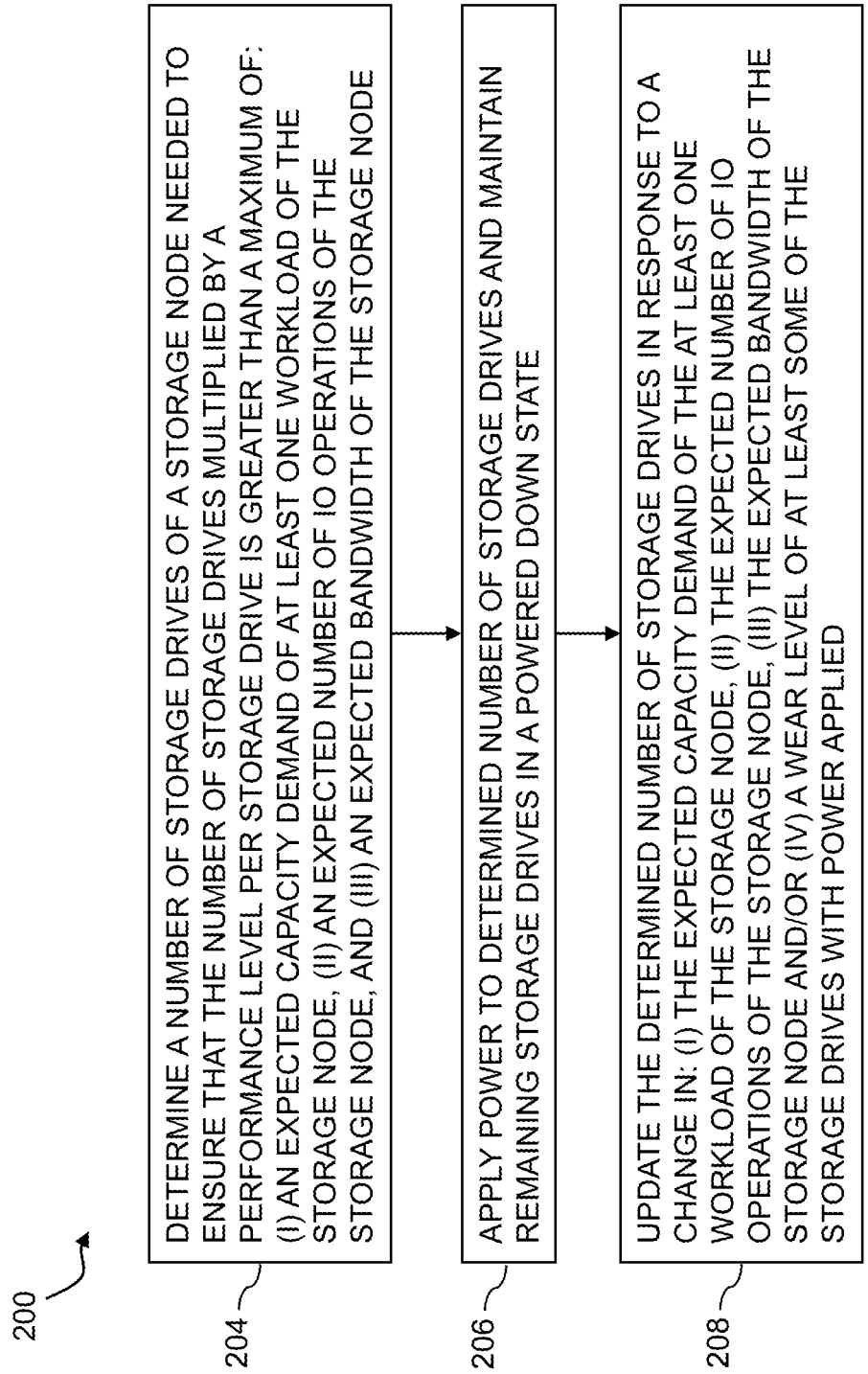
FIG. 2 is a flow diagram of a process for selective storage drive powering in a storage node in an illustrative embodiment.

The selective storage drive powering process 200 illustrated in FIG. 2 includes steps 204 through 208, and is assumed to be implemented at least partially by a particular one of the storage nodes 105 utilizing its corresponding instance of storage drive power module 114. Similar processes may be implemented primarily by each of the other ones of the storage nodes 105 utilizing their respective instances of storage drive power module 114. In other embodiments, the selective storage drive powering process 200 may be implemented, at least in part, for multiple storage nodes utilizing a single instance of a storage drive power module 114.

Step 204 determines a number of storage drives of a storage node needed to ensure that the number of storage drives multiplied by a performance level per storage drive is greater than a maximum of: (i) an expected capacity demand of at least one workload of the storage node, (ii) an expected number of IO operations of the storage node, and (iii) an expected bandwidth of the storage node.

In step 206, power is applied to the determined number of storage drives and the remaining storage drives are maintained in a powered down state. For example, an application of power to the remaining storage drives of the storage node may be at least temporarily delayed relative to an application of power to the determined number of storage drives.

In step 208, the determined number of storage drives is updated in response to a change in: (i) the expected capacity demand of the at least one workload of the storage node, (ii) the expected number of IO operations of the storage node, (iii) the expected bandwidth of the storage node and/or (iv) a wear level of at least some of the storage drives with power applied.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing selective powering of storage drive components in a storage node based on system performance limits. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different selective storage drive powering processes for respective different storage nodes 105 of an information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

In some embodiments, the number of needed storage drives is determined, at least in part, based on a needed storage capacity of the storage node. The needed storage capacity may be based, for example, on a maximum expected workload of the storage node (e.g., including burst activity). If the needed storage capacity is known, as well as the storage capacity of each available storage drive on a given storage node, then the number of storage drives needed to serve the needed storage capacity can be determined. For example, if the storage node comprises 20 storage drives and each drive can store 1 TB of data, and the needed storage capacity of the storage node is 2 TB, then only two storage drives are needed and should have power applied by the associated storage drive power module 114. If another TB of data is needed at a future time, then an additional storage drive can be activated by an application of power.

In one or more embodiments, the number of needed storage drives is determined, at least in part, based on an estimate of the expected number of input-output operations (IOPs) of at least one workload that will utilize the at least one storage node and/or an expected bandwidth of the at least one workload that will utilize the at least one storage node. The expected bandwidth of the at least one workload that will utilize the at least one storage node may comprise, for example, (i) the expected number of input-output operations of the at least one workload that will utilize the at least one storage node multiplied by (ii) an expected size of the input-output operations of the at least one workload that will utilize the at least one storage node. For example, if the storage node comprises 20 storage drives and each storage drive sustains a maximum of 100 MB/s, and the expected bandwidth of the workloads that will utilize the storage node is 500 MB/s, then only five storage drives are needed and should have power applied by the associated storage drive power module 114. If the bandwidth of the workloads that will utilize the storage node change over time, then an additional storage drive can be activated or deactivated.

In at least some embodiments, a system performance limit is determined by evaluating a component performance limit of at least one other component of a storage node, such as network card components, processing unit components and input-output card components of the storage node. For example, the system performance limit may be determined by determining a minimum component performance limit of the at least one other component of a storage node, and then the number of storage drives needed to support at least one workload of the at least one storage node can be based on the number of storage drives needed to support the system performance limit. The component performance limit of each of the additional components of the storage node can be based on an expected number of input-output operations of the at least one storage node and/or an expected bandwidth of the at least one storage node.

For example, the network card components may have a bandwidth limit of 500 MB/s. Thus, the storage node cannot receive more than 500 MB/s of data to process at a time. In such an arrangement, the number of needed storage drives is determined, at least in part, based on the component performance limit of the network card, and only five storage drives need to have an application of power, and the remaining storage drives on the storage node can be maintained in a powered off state.

In another example, the processing unit components may have an IOPs limit of 400K IOs/s. Thus, the storage node cannot receive more than 400K IOs/s to process at a time. In such an arrangement, where each storage drive can process 100K IOs/s, then the number of needed storage drives is determined to be four storage drives based at least in part on the component performance limit of the processing unit components.

In some embodiments, the storage system 102 can have a variety of storage drives, and the storage drives can be grouped or pooled based on one or more performance characteristics of each storage drive, and the disclosed techniques for selective storage drive powering can be separately applied for each group of storage drives. For example, solid-state drives can be grouped into one storage drive grouping and hard disk drives can be grouped into a second storage drive grouping.

In addition, in at least some embodiments, a wear level of at least some of the storage drives having power applied can be monitored to ensure, for example, that the active storage drives do not wear out during an expected lifetime of the respective storage drives. The drive wear may be measured, for example, using SMART (Self-Monitoring, Analysis, and Reporting Technology) drive data, or the drive write workload.

For example, if ten storage drives of 20 available storage drives have power applied, it may be desired that the ten active storage drives do not wear out during the expected lifetime while the 10 inactive storage drives have no wear at all. Thus, in some embodiments, the wear of at least some of available storage drives is monitored and (i) the determined number of storage drives of the at least one storage node that have an application of power, and/or (ii) a membership of the storage drives (e.g., which of the available storage drives) of the at least one storage node that have an application of power can be dynamically adjusted, based at least in part on the monitored wear level. The dynamic adjustments may be performed, for example, to balance the measured wear among the available storage drives.

Figure 3:
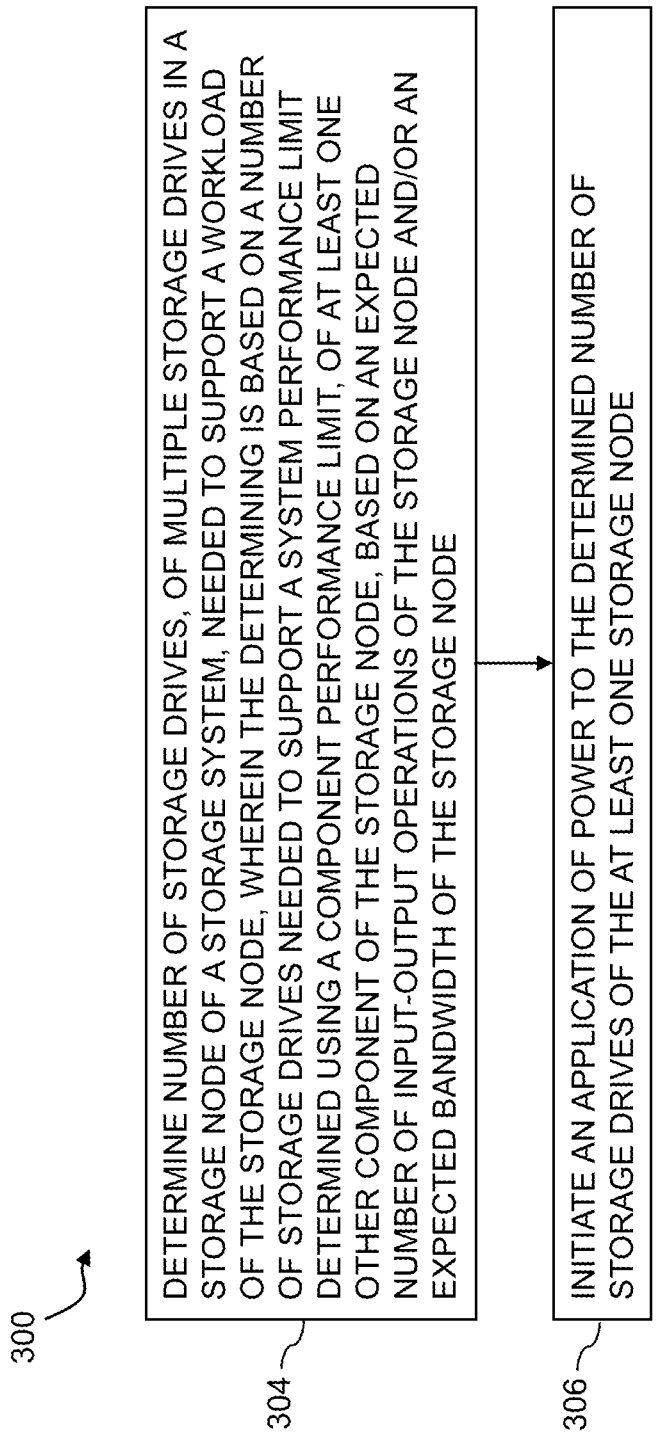
FIG. 3 is a flow diagram illustrating an exemplary implementation of a selective storage drive powering process, according to one embodiment of the disclosure.

FIG. 3 is a flow diagram illustrating an exemplary implementation of a selective storage drive powering process 300, according to one embodiment of the disclosure. The selective storage drive powering process 300 illustrated in FIG. 3 includes steps 304 and 306, and is assumed to be implemented primarily by a particular one of the storage nodes 105 utilizing its corresponding instance of storage drive power module 114. Similar processes may be implemented primarily by each of the other ones of the storage nodes 105 utilizing their respective instances of storage drive power module 114. In other embodiments, the selective storage drive powering process 300 may be implemented, at least in part, for multiple storage nodes utilizing a single instance of a storage drive power module 114.

Step 304 determines a number of storage drive components, of a plurality of storage drive components in at least one storage node of a storage system, needed to support at least one workload of the at least one storage node, wherein the determining is based at least in part on a number of storage drive components needed to support a system performance limit determined using a component performance limit of at least one other component of the at least one storage node, wherein the component performance limit is based at least in part on one or more of an expected number of input-output operations of the at least one storage node and an expected bandwidth of the at least one storage node.

Step 306 initiates an application of power to the determined number of storage drive components of the at least one storage node.

In some embodiments, the determining the number of storage drive components needed to support the at least one workload is further based on an expected capacity demand of the at least one workload determined using at least one predicted capacity demand of the at least one workload based at least in part on a historical capacity utilization of the at least one workload. For example, a regression model can be employed to perform the prediction of the expected capacity demand. In this manner, the storage drive power module 114 of each storage node 105 can proactively adjust the number of active storage drives, as needed, as the needs of the workloads that utilize the respective storage node change over time.

The determined number of storage drive components that have an application of power may be changed in response to a change in at least one of: (i) an expected capacity demand of the at least one workload and (ii) the component performance limit based on the one or more of the expected number of input-output operations of the at least one storage node and the expected bandwidth of the at least one storage node. The addition of new storage drives is a standard procedure in most storage systems 102. Such a data rebalancing process can be performed as the number of active storage drives changes, to handle the rates to ensure that the executing workloads are not impacted by the change in the number of active storage drives. During a peak workload, for example, the rebalance rate can be low and the time to complete the rebalance can be high, so the timing of the adjustment to the number of active storage drives may be an important consideration.

As noted above, the plurality of storage drive components in the at least one storage node may comprise a solid-state drive class of storage drive components and a hard disk drive class of storage drive components and the determining the number of storage drive components needed to support the at least one workload may be separately determined for at least the solid-state drive class of storage drive components. The performance characteristics (e.g., IOPs, and MB/s for IOs) for each drive type may be well known, and the disclosed techniques for selective storage drive powering can ensure that the number of active storage drives multiplied by the performance of each storage drive is higher than the expected maximum IOPs and bandwidth that the system can do based on the other components of the storage node.

Consider an example where large read operations are processed in a storage node having 24 solid-state drives that can process 1 GB/sec. In addition, the component performance limit for the storage node is limited by the network interface cards providing an expected (e.g., required) performance per node of approximately 5 GB/sec. Thus, five storage drives can be activated to deliver the system performance limit of approximately 5 GB/sec, and the additional storage drives can be offline and not consume any power (without any risk to the performance of the system as the performance limits are not with the storage drives).

In one or more embodiments, the wear of at least some of the plurality of storage drive components can be monitored and (i) the determined number of storage drive components of the at least one storage node that have an application of power, and/or (ii) a membership of the storage drive components of the at least one storage node that have an application of power can be dynamically adjusted, based at least in part on the monitored wear level. The drive wear may be measured, for example, using SMART drive data and/or the drive write workload.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for implementing selective powering of storage drive components in a storage node based on system performance limits. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different selective storage drive powering processes for respective different storage nodes 105 of an information processing system.

These and other embodiments disclosed herein provide significant advantages over conventional approaches.

For example, illustrative embodiments provide selective storage drive powering implemented by a storage node 105 and/or other system components configured to interact with storage nodes of a distributed storage system over one or more networks.

Moreover, these embodiments can improve power efficiency, for example, by avoiding an application of power to storage drive components that are not needed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement storage nodes 105 with selective storage drive powering functionality will now be described in greater detail with reference to FIGS. 4 and 5. Although described in the context of system 100, these platforms may also be used to implement at least portions of other information processing systems in other embodiments.

Figure 4:
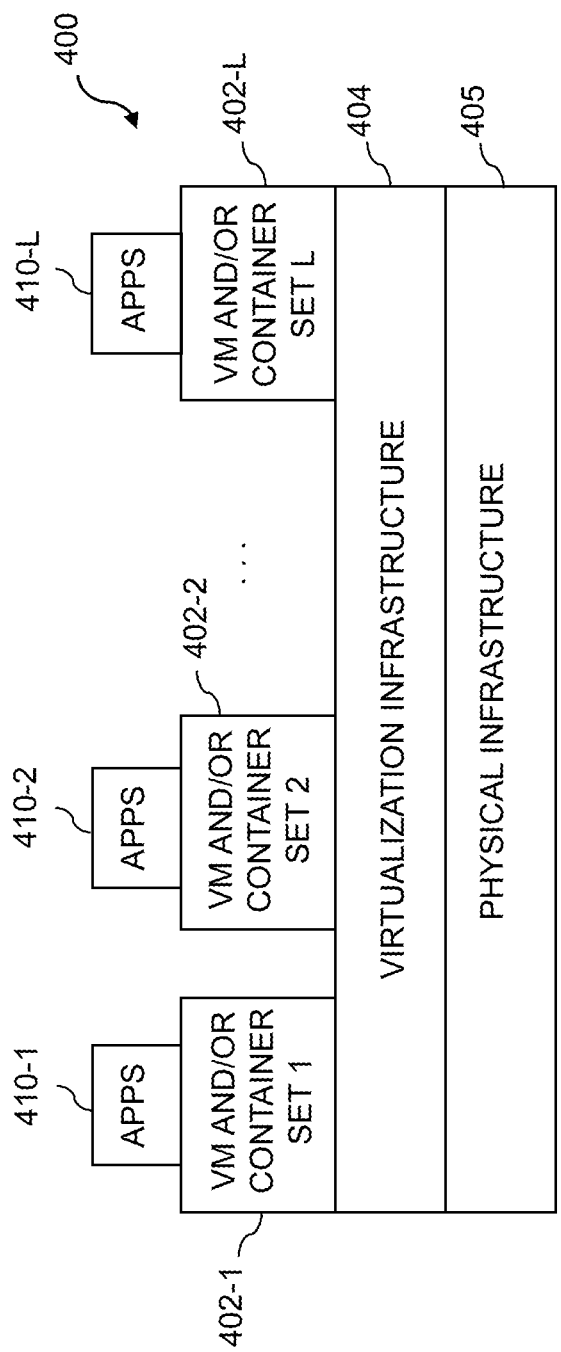
FIGS. 4 and 5 show examples of processing platforms that may be utilized to implement at least a portion of an information processing system in illustrative embodiments.
Figure 5:
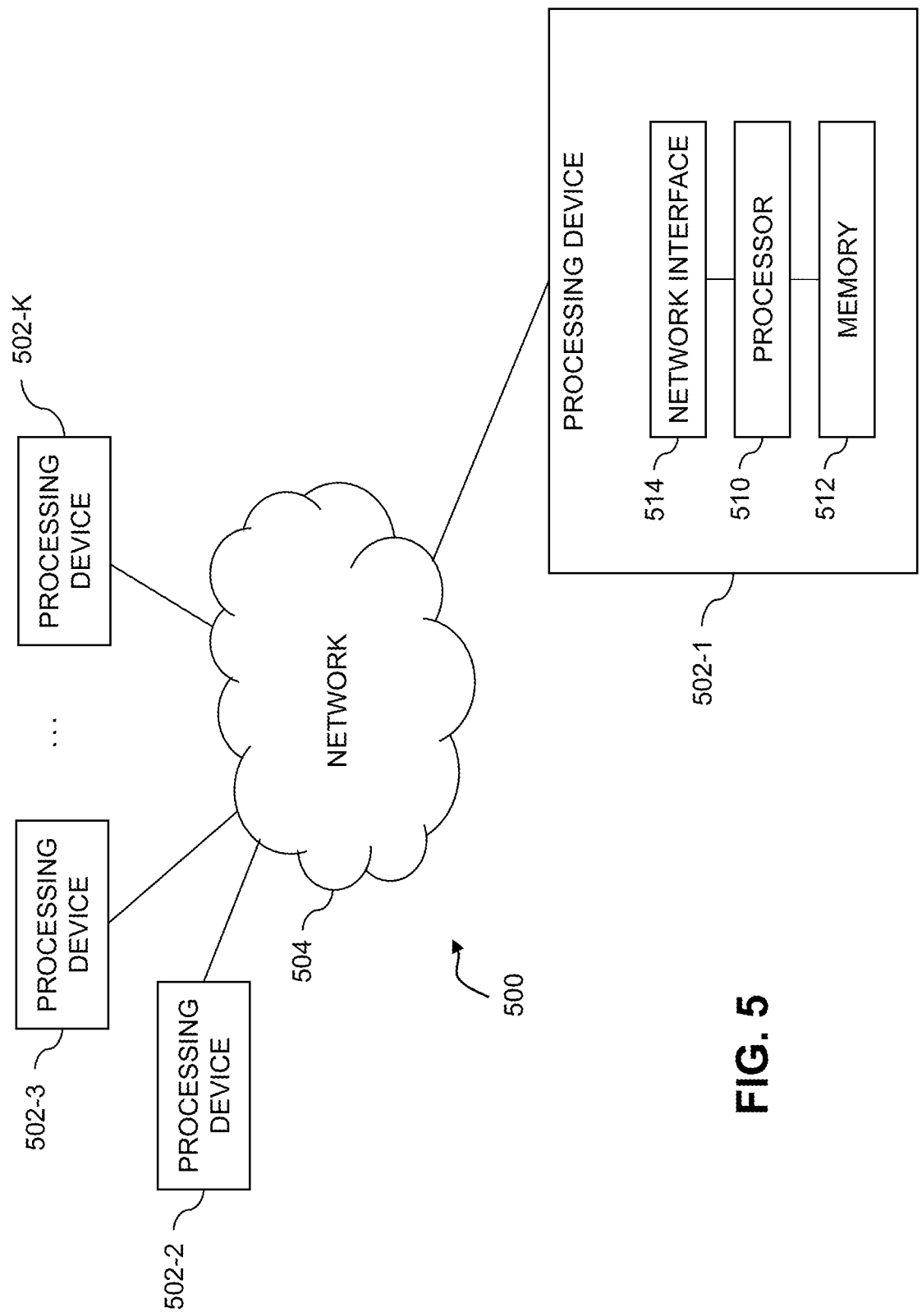

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide selective storage drive powering functionality in a distributed storage system of the type described above using one or more processes running on a given one of the VMs. For example, each of the VMs can implement logic instances and/or other components for implementing functionality associated with selective storage drive powering in the system 100.

A hypervisor platform may be used to implement a hypervisor within the virtualization infrastructure 404. Such a hypervisor platform may comprise an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can also provide selective storage drive powering functionality in a distributed storage system of the type described above. For example, a container host device supporting multiple containers of one or more container sets can implement logic instances and/or other components for implementing selective storage drive powering functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the selective storage drive powering functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, initiators, targets and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    determining a number of storage drive components, of a plurality of storage drive components in at least one storage node, of a plurality of storage nodes, of a storage system, needed to support at least one workload of the at least one storage node, wherein the determining is based at least in part on a number of storage drive components needed to support a system performance limit determined using a component performance limit of at least one other component of the at least one storage node, wherein the component performance limit is based at least in part on one or more of an expected number of input-output operations of the at least one storage node and an expected bandwidth of the at least one storage node, wherein the component performance limit of the at least one other component provides a limit on the one or more of the expected number of input-output operations of the at least one storage node and the expected bandwidth of the at least one storage node to be supported by the determined number of storage drive components of the at least one storage node; and
    initiating an application of power to the determined number of storage drive components of the at least one storage node;
    wherein the method is performed by at least one processing device comprising a processor coupled to a memory.

2. The method of claim 1, wherein the determining the number of storage drive components needed to support the at least one workload is further based on an expected storage capacity demand of the at least one workload determined using at least one predicted storage capacity demand of the at least one workload based at least in part on a historical storage capacity utilization of the at least one workload.

3. The method of claim 1, wherein the component performance limit based on the expected number of input-output operations is determined by a component performance limit of at least one processing unit component associated with the at least one storage node.

4. The method of claim 1, further comprising updating the determined number of storage drive components that have an application of power in response to a change in at least one of: (i) an expected capacity demand of the at least one workload, and (ii) the component performance limit based on the one or more of the expected number of input-output operations of the at least one storage node and the expected bandwidth of the at least one storage node.

5. The method of claim 1, wherein the plurality of storage drive components in the at least one storage node comprises at least a solid-state drive class of storage drive components and a hard disk drive class of storage drive components and wherein the determining the number of storage drive components needed to support the at least one workload is separately determined for at least the solid-state drive class of storage drive components.

6. The method of claim 1, wherein the expected bandwidth of the at least one storage node comprises the expected number of input-output operations of the at least one storage node multiplied by an expected size of the input-output operations of the at least one storage node.

7. The method of claim 1, further comprising monitoring a wear level of at least some of the plurality of storage drive components and dynamically adjusting, based at least in part on the monitored wear level, one or more of: (i) the determined number of storage drive components of the at least one storage node that have an application of power, and (ii) a membership of the storage drive components of the at least one storage node that have an application of power.

8. The method of claim 1, wherein the system performance limit is determined by a minimum component performance limit of the at least one other component of the at least one storage node.

9. The method of claim 1, wherein initiation of an application of power to one or more additional storage drive components of the at least one storage node is at least temporarily delayed relative to the initiation of the application of power to the determined number of storage drive components.

10. An apparatus comprising:
   at least one processing device comprising a processor coupled to a memory;
   the at least one processing device being configured to implement the following steps:
   determining a number of storage drive components, of a plurality of storage drive components in at least one storage node, of a plurality of storage nodes, of a storage system, needed to support at least one workload of the at least one storage node, wherein the determining is based at least in part on a number of storage drive components needed to support a system performance limit determined using a component performance limit of at least one other component of the at least one storage node, wherein the component performance limit is based at least in part on one or more of an expected number of input-output operations of the at least one storage node and an expected bandwidth of the at least one storage node, wherein the component performance limit of the at least one other component provides a limit on the one or more of the expected number of input-output operations of the at least one storage node and the expected bandwidth of the at least one storage node to be supported by the determined number of storage drive components of the at least one storage node; and
   initiating an application of power to the determined number of storage drive components of the at least one storage node.

11. The apparatus of claim 10, wherein the determining the number of storage drive components needed to support the at least one workload is further based on an expected storage capacity demand of the at least one workload determined using at least one predicted storage capacity demand of the at least one workload based at least in part on a historical storage capacity utilization of the at least one workload.

12. The apparatus of claim 10, further comprising updating the determined number of storage drive components that have an application of power in response to a change in at least one of: (i) an expected capacity demand of the at least one workload, and (ii) the component performance limit based on the one or more of the expected number of input-output operations of the at least one storage node and the expected bandwidth of the at least one storage node.

13. The apparatus of claim 10, wherein the plurality of storage drive components in the at least one storage node comprises at least a solid-state drive class of storage drive components and a hard disk drive class of storage drive components and wherein the determining the number of storage drive components needed to support the at least one workload is separately determined for at least the solid-state drive class of storage drive components.

14. The apparatus of claim 10, further comprising monitoring a wear level of at least some of the plurality of storage drive components and dynamically adjusting, based at least in part on the monitored wear level, one or more of: (i) the determined number of storage drive components of the at least one storage node that have an application of power, and (ii) a membership of the storage drive components of the at least one storage node that have an application of power.

15. The apparatus of claim 10, wherein the system performance limit is determined by a minimum component performance limit of the at least one other component of the at least one storage node.

16. A non-transitory processor-readable storage medium having stored therein program code of one or more software programs, wherein the program code when executed by at least one processing device causes the at least one processing device to perform the following steps:
   determining a number of storage drive components, of a plurality of storage drive components in at least one storage node, of a plurality of storage nodes, of a storage system, needed to support at least one workload of the at least one storage node, wherein the determining is based at least in part on a number of storage drive components needed to support a system performance limit determined using a component performance limit of at least one other component of the at least one storage node, wherein the component performance limit is based at least in part on one or more of an expected number of input-output operations of the at least one storage node and an expected bandwidth of the at least one storage node, wherein the component performance limit of the at least one other component provides a limit on the one or more of the expected number of input-output operations of the at least one storage node and the expected bandwidth of the at least one storage node to be supported by the determined number of storage drive components of the at least one storage node; and
   initiating an application of power to the determined number of storage drive components of the at least one storage node.

17. The non-transitory processor-readable storage medium of claim 16, further comprising updating the determined number of storage drive components that have an application of power in response to a change in at least one of: (i) an expected capacity demand of the at least one workload, and (ii) the component performance limit based on the one or more of the expected number of input-output operations of the at least one storage node and the expected bandwidth of the at least one storage node.

18. The non-transitory processor-readable storage medium of claim 16, wherein the plurality of storage drive components in the at least one storage node comprises at least a solid-state drive class of storage drive components and a hard disk drive class of storage drive components and wherein the determining the number of storage drive components needed to support the at least one workload is separately determined for at least the solid-state drive class of storage drive components.

19. The non-transitory processor-readable storage medium of claim 16, further comprising monitoring a wear level of at least some of the plurality of storage drive components and dynamically adjusting, based at least in part on the monitored wear level, one or more of: (i) the determined number of storage drive components of the at least one storage node that have an application of power, and (ii) a membership of the storage drive components of the at least one storage node that have an application of power.

20. The non-transitory processor-readable storage medium of claim 16, wherein the system performance limit is determined by a minimum component performance limit of the at least one other component of the at least one storage node.

* * * * *